United States Patent [19]
Shimizu et al.

[11] Patent Number: 5,846,429
[45] Date of Patent: Dec. 8, 1998

[54] METHOD FOR SEPARATING AND RECOVERING BORON TRIFLUORIDE

[75] Inventors: Isoo Shimizu; Yoshisuke Kakuyama, both of Yokohama; Tsutomu Takashima, Kawasaki, all of Japan

[73] Assignee: Nippon Petrochemicals Company, Limited, Tokyo, Japan

[21] Appl. No.: 798,727

[22] Filed: Feb. 13, 1997

[30] Foreign Application Priority Data

| Feb. 20, 1996 | [JP] | Japan | 8-056882 |
| Feb. 21, 1996 | [JP] | Japan | 8-058354 |
| Feb. 21, 1996 | [JP] | Japan | 8-058355 |

[51] Int. Cl.$^6$ .................................................. B01D 15/00
[52] U.S. Cl. .......................... 210/670; 210/660; 423/293; 585/823
[58] Field of Search ........................ 208/262.1; 210/660, 210/670; 423/293; 585/823

[56] References Cited

U.S. PATENT DOCUMENTS

| 2,167,358 | 7/1939 | Gleason | 23/205 |
| 2,997,371 | 8/1961 | Wadsworth et al. | 423/293 |
| 4,263,467 | 4/1981 | Madgavkar et al. | 423/293 |
| 4,384,162 | 5/1983 | Vogel et al. | 585/823 |

FOREIGN PATENT DOCUMENTS

WO 85/01942  5/1985  WIPO.

*Primary Examiner*—Ivars Cintins
*Attorney, Agent, or Firm*—Fisher, Christen & Sabol

[57] ABSTRACT

A method for effectively separating and removing or recovering $BF_3$ existing in a liquid hydrocarbon which is characterized in that an organic liquid mixture containing suspended or dissolved $BF_3$ is brought into liquid phase contact with a synthetic polymer fiber containing nitrile groups at a temperature of 50° C. or lower, so that the $BF_3$ is adsorbed by the synthetic polymer fiber and it is then heated to 80° C. or higher to recover the $BF_3$.

25 Claims, No Drawings

5,846,429

METHOD FOR SEPARATING AND RECOVERING BORON TRIFLUORIDE

BACKGROUND OF THE INVENTION

(1) Field of the Invention

This invention relates to a method for separating and recovering boron trifluoride (hereinafter referred to as "$BF_3$") from an organic liquid mixture. More particularly, the invention relates to a method for separating and recovering $BF_3$ from an organic liquid mixture using polyacrylonitrile fiber.

(2) Prior Art

The compound $BF_3$ is an important acidic substance which is used frequently in industry as a catalyst for various kinds of polymerization of olefins and alkylation reaction.

For example, the polymerization product of isobutylene, commonly known as polybutene, is prepared by polymerizing a fraction mainly consisting of $C_4$ hydrocarbons containing isobutylene in the presence of an acid catalyst. It is widely used as an additive for raw materials of adhesive agents and lubricants. The $BF_3$ or its complex is used as a polymerization catalyst for producing the above polybutene.

Furthermore, a low molecular weight hydrocarbon resin which is generally known as petroleum resin, is prepared by polymerizing a $C_9$ aromatic olefin fraction or a $C_5$ diolefin fraction or their mixture in the presence of an acid catalyst. This petroleum resin is used as a raw material for producing adhesives and printing inks. The $BF_3$ is also used widely as a polymerization catalyst in the industrial production of petroleum resins.

In these production processes, it is necessary to separate and remove the $BF_3$ catalyst from a reaction mixture after the reaction. For this purpose, in general practice, the reaction mixture is neutralized with an aqueous solution of alkali which is followed by washing with water.

However, the waste solution containing the used alkali, the fluoride generated by the neutralization of $BF_3$ and emulsified substances are discharged from the washing process. Therefore, it is necessary to take proper measures so as to treat the waste liquid. For this purpose, a method of adsorbing with a solid alkali, a method of separating by distillation, a method of extracting using a specific solvent and the like method are proposed as the measures to separate $BF_3$.

In the above adsorption treatment with a solid alkali, the disposal of generated solid substance by adsorption again comes into question. In the removal with distillation, the deterioration of reaction product by heating becomes a problem. Therefore, a more effective treatment method is eagerly wanted.

It is disclosed, in U.S. Pat. No. 2,997,371, that acrylonitrile is polymerized on activated carbon and the $BF_3$ contained in gas is separated and removed with the polyacrylonitrile which is supported on the activated carbon.

However, as it is known that the $BF_3$ forms complexes with certain organic liquids, the physical or chemical bonding strength of $BF_3$ with organic liquid is large. So that, the $BF_3$ suspended or dissolved in an organic solvent cannot always be removed effectively with using the above-mentioned polyacrylonitrile supported on activated carbon. In addition, it is generally difficult to obtain highly polymerized product when the polyacrylonitrile is prepared on the carrier of activated carbon. Meanwhile, if a lower polymer of acrylonitrile is used, it is dissolved into the organic liquid and it contaminates the organic liquid.

BRIEF SUMMARY OF THE INVENTION

In view of the above-described state of the art, the inventors of the present invention have accomplished by investigating the method for effectively separating and removing or recovering the $BF_3$ which is contained in a liquid hydrocarbon by using a specific acrylic fiber.

A first aspect of the present invention, therefore, relates to a separating method for $BF_3$ which is characterized in that an organic liquid mixture containing suspended or dissolved $BF_3$ is brought into liquid contact with high molecular weight fiber containing nitrile groups at a temperature of 50° C. or below.

The organic liquid mixture containing suspended or dissolved $BF_3$ to be treated is exemplified by a liquid reaction mixture containing isobutylene polymer which is obtained by the liquid phase polymerization of isobutylene in the presence of $BF_3$ catalyst or its complex and a liquid reaction mixture containing hydrocarbon resin which is obtained by the polymerization of a hydrocarbon mixture containing $C_5$ olefin, $C_9$ aromatic olefin, $C_{10}$ olefin or their mixture in the presence of $BF_3$ catalyst.

A second aspect of the present invention relates to a separation method which is characterized in that the high molecular weight fiber containing nitrile groups used in the above first aspect comprises polyacrylonitrile containing 80 mole % or more of acrylonitrile repeating units.

A third aspect of the present invention relates to a separation method which is characterized in that the high molecular weight fiber containing nitrile groups used in the above first aspect, is extremely fine fiber of 2 denier or less.

Furthermore, a fourth aspect of the invention relates to a method for recovering $BF_3$ which is characterized in that the high molecular weight fiber containing nitrile groups which was brought into contact with the liquid mixture containing $BF_3$ in the above first to third aspects of the invention is heated to a temperature of 80° C. or above.

DETAILED DESCRIPTION OF THE INVENTION

The present invention will be described in more detail.

In the first place, the material to be treated by the method of the present invention will be described. The material to be treated is basically any of organic liquid mixtures containing $BF_3$. The $BF_3$ may be in a dissolved state or suspended state.

As the organic liquid mixture like this, it is exemplified by a reaction mixture which is obtained from the liquid phase polymerization of isobutylene in the presence of $BF_3$ catalyst.

More particularly, it is exemplified by a liquid reaction mixture containing a polymer which is obtained by liquid phase addition polymerization of an olefin in the presence of $BF_3$ catalyst. The olefins are exemplified by aliphatic or alicyclic olefins such as ethylene, propylene, butene, isobutylene, pentene, cyclopentene, cyclopentadiene, piperylene, isoprene and dicyclopentadiene; and aromatic olefins such as styrene, α-methylstyrene, vinyltoluene and indene. For the liquid phase polymerization, the olefin is polymerized in an appropriate solvent, preferably in a hydrocarbon solvent or the olefin is subjected to block polymerization with the olefin itself as a solvent. After the polymerization, the $BF_3$ or its complex as a catalyst in the liquid phase polymerization exists in the form of suspension or in dissolved state in the liquid reaction mixture containing the polymer.

The liquid phase addition polymerization of olefins in the presence of $BF_3$ catalyst is widely carried out in the industrial production of, for example, polyisobutylene and petroleum resin.

More particularly, solution polymerization, slurry polymerization or block polymerization is carried out using isobutylene singly or a mixture of isobutylene and a comonomer such as n-butene or isoprene which can be copolymerized with the isobutylene. The temperature of polymerization is not especially limited and, as long as the reaction mixture can maintain liquid state, the polymerization is done at temperatures in the range of $-70°$ to $+100°$ C. By controlling mainly the polymerization temperature, it is possible to produce any of polymers ranging from isobutylene dimer or codimer to rubber-like high polymers.

Accordingly, the term isobutylene polymer herein referred to includes polymers and copolymers from the low molecular weight oligomers such as isobutylene dimer and codimer to viscous liquid polymers having number average molecular weights of several thousands as well as the rubber-like polymers having viscosity average molecular weights from several tens of thousands to one million. Furthermore, the term isobutylene polymer includes, as described above, the copolymers with the comonomers such as n-butene and isoprene. However, the copolymers which are inert to the above-mentioned polyacrylonitrile fiber are preferable.

Concerning the solvent for polymerization, isobutylene itself can be used and other saturated hydrocarbons such as propane and butane can also be used.

The liquid phase polymerization of isobutylene is typically exemplified by the production of polybutene through the polymerization of isobutylene and other olefins such as $C_4$ fraction containing n-butene. In this case, a reaction mixture consisting of hydrocarbon mixture containing dissolved polybutene is obtained after the reaction.

A catalyst of $BF_3$ or its complex is used in the liquid phase polymerization of isobutylene. For example, any of conventionally known catalysts for the preparation of polybutene can be used as the $BF_3$ catalyst. The $BF_3$ complexes are exemplified by the $BF_3$ compounds with oxygen-containing compounds such as alcohols, ethers, phenols, ketones, aldehydes, esters, organic acids and acid anhydrides. $BF_3$ etherate (e.g., a complex of $BF_3$ with ethyl ether) is a typical example of the $BF_3$ complex catalyst.

The above-mentioned complexes are isolated as complex themselves at low temperatures, however, when they are heated, they are easily decomposed into respective component substances which can be separated by distillation.

The use quantity of the catalyst of $BF_3$ or its complex is not limited. In general cases, 0.001 to 10 wt. % of the catalyst is added to a reaction system. The added catalyst remains intact after polymerization reaction in the reaction mixture. When isobutylene is polymerized in liquid phase, the liquid reaction mixture containing the catalyst of $BF_3$ or its complex and isobutylene polymer is obtained. This reaction mixture is subjected to the treatment of the method of the present invention.

Furthermore, the mixture of $BF_3$ and organic liquid to be treated is exemplified by reaction mixtures which are obtained by polymerizing $C_9$ aromatic olefin fraction or $C_5$ diolefin fraction in the presence of an acid catalyst. The $C_5$ olefins as polymerizable components are aliphatic or alicyclic monoolefins and diolefins such as pentene, cyclopentene, cyclopentadiene, piperylene and isoprene. In the hydrocarbon mixture, the components besides the polymerizable components are mainly saturated hydrocarbons. The hydrocarbon mixture mainly containing polymerizable $C_5$ olefin components, contains small amounts of butadiene of $C_4$ olefin, cyclopentadiene and $C_6$ olefins in addition to the polymerizable $C_5$ olefins. This $C_5$ olefin fraction is obtained as a by-product of thermal cracking or catalytic cracking of volatile petroleum hydrocarbons such as naphtha and butane.

The $C_9$ aromatic olefins as polymerizable components are exemplified by aromatic olefins such as styrene, α-methylstyrene, vinyltoluene and indene having 9 carbon atoms. The components other than the polymerizable components in the hydrocarbon mixture are mainly saturated hydrocarbons. The hydrocarbon mixture mainly containing $C_9$ aromatic olefins as polymerizable components is exemplified by a fraction which mainly contains $C_9$ aromatic olefins and small amounts of $C_8$ olefins and $C_{10}$ olefins such as methyl indene and dicyclopentadiene. This $C_9$ aromatic olefin fraction is obtained as a by-product of thermal cracking or catalytic cracking of volatile petroleum hydrocarbons such as naphtha and butane.

Furthermore, the polymerizable $C_{10}$ olefins are dicyclopentadiene and the dimer of isoprene. The components other than the polymerizable components are mainly saturated hydrocarbons. The hydrocarbon mixture mainly containing $C_{10}$ olefins as polymerizable components is exemplified by a fraction which mainly contains cyclopentadiene and a small amount of other olefins such as the dimer of methylcyclopentadiene. This $C_{10}$ olefin fraction is obtained as a by-product of thermal cracking or catalytic cracking of volatile petroleum hydrocarbons such as naphtha and butane.

As the polymerizable components, the $C_5$ olefin, $C_9$ aromatic olefin and C olefin can be used as a mixture of them. In the hydrocarbon mixture containing the above $C_5$ olefin and $C_9$ aromatic olefin as polymerizable components, they may be mixed together at appropriate ratios.

The content of polymerizable component in the hydrocarbon mixture is not especially limited. It is generally in the range of 10 to 90 wt. % and most of the remainder components are saturated hydrocarbons.

In the above liquid phase polymerization, the catalyst consisting of $BF_3$ or its complex is also used. Any of conventionally known catalysts for the preparation of petroleum resin can be used as this $BF_3$ catalyst. The $BF_3$ complexes are exemplified by the complexes of $BF_3$ with oxygen-containing compounds such as alcohols, ethers, phenols, ketones, aldehydes, esters, organic acids and acid anhydrides, which are the same as the case of liquid phase polymerization of isobutylene.

The use quantity of the catalyst of $BF_3$ or its complex is not especially limited. In the like manner as the foregoing liquid phase polymerization of isobutylene, 0.001 to 10 wt. % of the catalyst is added to a reaction system. The added catalyst remains intact after polymerization reaction in the reaction mixture.

By carrying out the liquid phase polymerization for producing hydrocarbon resin, the liquid reaction mixture containing $BF_3$ or its complex and hydrocarbon resin is obtained, which reaction mixture is then treated by the method of the present invention.

The fiber which is used in the method of the present invention is a synthetic polymer fiber containing nitrile groups and it does not dissolve substantially in organic solvents. Preferably, it is composed of the fiber (filaments) of polyacrylonitrile which contains 80 mole % or more of repeating units of acrylonitrile. The fiber used in the present invention is prepared by polymerizing acrylonitrile by a conventional method and it is spun into extremely fine fiber through ordinary spinning method. The polymerization of acrylonitrile is carried out in the like manner as the conventional radical polymerization of vinyl monomer, which is industrially processed by aqueous suspension polymerization or homogeneous solution polymerization. When the polymerization is carried out by the aqueous suspension polymerization, the product of sufficiently high polymerization degree is usually obtained, so that the problem of environmental pollution owing to low molecular weight products is scarcely caused to occur. Also in the case of the homogeneous solution polymerization, the product of sufficiently high polymerization degree can be obtained by selecting polymerization conditions and using a proper organic solvent such as dimethyl sulfoxide (DMSO), N,N-dimethylacetamide (DMAc) or N,N-dimethylformamide (DMF). So that, the problem of environmental pollution owing to low molecular weight products is hardly caused to occur.

The problem that the organic liquid is contaminated by the dissolving out of lower molecular polymer can be reduced by the countermeasure, for example, that the polymer is washed and extracted with a suitable solvent after the polymerization and before or after the processing of fiber.

In order to impart good acid resistance to the polyacrylonitrile, the content of acrylonitrile in the polyacrylonitrile is adjusted to a value in the range of 80 mole % or higher. If the content of acrylonitrile is higher than the above value, nonionic comonomers such as acrylic ester, methacrylic ester, vinyl acetate and acrylamide; anionic comonomers such as vinyl benzenesulfonic acid and allylsulfonic acid; cationic comonomers such as vinyl pyridine and methylvinyl pyridine, and other comonomers such as vinyl chloride and vinylidene chloride, can also be used. If these monomers are copolymerized, the processing of fiber can be made easy and the strength of fiber is made high.

The method to produce fiber from polyacrylonitrile is not limited. Any method to produce very fine fiber can be employed. For example, the production of fiber can be carried out by a known wet or dry spinning method.

The cross-sectional configuration of each fiber is not limited. It is generally round, however, the cross-section of the fiber having a different shape can be used such as a hollow tubular shape or fiber having a star-shaped cross-section.

In order to attain a higher adsorption efficiency for $BF_3$, it is preferable to use extremely fine fiber of 2 denier or less. More particularly, the preferable gauge of fiber is from 0.01 to 2 denier.

As the fiber used for the method of the present invention, it may be in the forms of woven fabric, non-woven fabric, braided fabric and fluff. The material in the form of non-woven fabric is convenient for use. For example, the non-woven fabric made of polyacrylonitrile fiber which are available in the market, can be used.

The organic liquid as the solvent or dispersing medium of the $BF_3$/organic liquid mixture to be treated in the method of the invention, may be any of those which can contain the $BF_3$ in dissolved state or suspended state. However, under the conditions for separating and recovering of $BF_3$, the liquid which dissolves or swells the above fiber is not suitable. More particularly, alcohols such as methyl alcohol, ethers such as ethyl ether, phenols as well as hydrocarbons of aromatic hydrocarbons, aliphatic hydrocarbons and alicyclic hydrocarbons and their mixtures can be used.

The $BF_3$ exists in the organic liquid in dissolved state or dispersed state. Furthermore, the $BF_3$ can be dissolved or dispersed in the form of $BF_3$ complex with any one of the above organic liquids itself or with other oxygen-containing compounds such as alcohols, ethers, phenols, ketones, aldehydes, esters, organic acids and acid anhydrides.

As the organic liquid mixture containing suspended or dissolved $BF_3$ in the method of the present invention, as described above, the liquid reaction mixture containing the $BF_3$ or its complex which is obtained in the reaction in the presence of a $BF_3$ catalyst, can be used.

If the $BF_3$ contained in the organic liquid mixture is a complex, the concentration of the $BF_3$ sometimes becomes considerably high. However, in order to raise the separation efficiency, it is generally desirable to use a dilute solution. More particularly, the concentration is 10 wt. % or less, and more preferably less than 5 wt. % as $BF_3$. The lower the concentration is, the higher the separation efficiency. Even though there is no limit of the low concentration, the organic liquid mixture of higher than 0.001 ppm in concentration is treated in practical working.

In order to separate and remove the $BF_3$ from the organic liquid mixture containing suspended or dissolved $BF_3$, the organic liquid mixture and the fiber are brought into contact in a liquid phase at temperatures of 50° C. or lower. If the temperature is lower than this value, the adsorption efficiency for $BF_3$ is high. As long as the liquid phase contact is possible, any temperature lower than 50° C. can be employed. More particularly, the temperature range is preferably from −30° to +50° C.

The practical method for the liquid phase contact is not especially limited. For example, a vessel is filled with the fiber itself or a nonwoven fabric made of the fiber and the organic liquid mixture containing suspended or dissolved $BF_3$ is passed through the fiber. The type of contacting operation may be any of flow method and batchwise method. The time length of contact is not limited either, so that it can be determined arbitrarily. In general, the range of 0.01 to 10 $hr^{-1}$ in space velocity is selected in the flow method. The use quantity of the fiber is also selected arbitrarily.

Through the above liquid phase contact, the suspended or dissolved $BF_3$ in the organic liquid mixture is adsorbed by the fiber, so that it is separated and removed from the organic liquid.

In order to recover by separating (desorbing) the adsorbed $BF_3$ from the fiber, the fiber with adsorbed substance is heated. The heating can be carried out by using a proper inert gas such as nitrogen gas. It is also possible to heat in an organic medium if it is inert.

The heating temperature is 80° C. or higher so as to make the rate of desorption higher. The temperature of desorption is preferably higher than 100° C. There is no especially upper limit of the temperature for desorption. The higher the temperature, the faster the desorption. However, it should be noted that the practical upper limit is 140° C. in view of the thermal resistance of the fiber.

The fiber which is employed for the adsorption and desorption of the $BF_3$, can be used again repeatedly. By using the foregoing fiber according to the present invention, the capacity of $BF_3$ adsorption is not degraded through repeated uses, so that it is possible to use the fiber repeatedly for a plurality of operation cycles.

The $BF_3$ is generally desorbed in the gas phase, what is more, its purity is high. Accordingly, the desorbed $BF_3$ is recovered by an optional method and it is possible to use again the recovered substance. It is also possible to discard the $BF_3$ by adsorbing it with an optional solid alkali.

EXAMPLE 1

(Adsorption)

A stainless steel pipe of 25 mm in diameter and 250 mm in length was filled with 35 g of a bundle of acrylic fiber (90% acrylonitrile) of 0.9 denier gauge.

The above-mentioned pipe was maintained in a constant temperature of 25° C. and an ethyl ether solution of $BF_3$ etherate (0.25 wt. % as $BF_3$) was fed at a constant rate of 100 ml/hr. The concentration of $BF_3$ in the effluent was 0 (zero), from which it was confirmed that the $BF_3$ was completely adsorbed.

The operation of adsorption was further continued and when the $BF_3$ was detected in the effluent after 18 hours from the start of feeding of ethyl ether solution, the feeding was stopped.

After that, the fiber in the packed tube was washed with 200 ml of pure ethyl ether. Nitrogen gas was fed into the packed tube so as to dry up by evaporating ethyl ether and the weight of packed tube was then weighed. The difference between the above weight and the initial weight which was previously examined before the feed of $BF_3$ solution, was obtained. As a result, it was confirmed that the quantity of $BF_3$ adsorbed and retained in the acrylic fiber was 8.6 g per 100 g of the fiber.

(Desorption)

The above packed tube filled with the acrylic fiber containing the adsorbed $BF_3$ was fed with nitrogen gas at a rate of 10 ml/min (as N.T.P.) and the heating of the packed tube was started so as to maintain the tube at 120° C. The nitrogen effluent was introduced into ethyl ether.

By observing the nitrogen flow at the outlet port, the feeding of nitrogen and the heating of the packed tube was continued until the white smoke of $BF_3$ became scarce. After that, the packed tube was weighed and it was confirmed that the remaining $BF_3$ was 0.9 g per 100 g of fiber and the rate of recovery of adsorbed $BF_3$ was 90%.

EXAMPLE 2

In the like manner as in Example 1, a phenol solution of $BF_3$ phenolate ($BF_3$ concentration: 0.3 wt. %) and an ethyl alcohol solution of $BF_3$ ethyl alcohol complex ($BF_3$ concentration: 0.5 wt. %) were subjected to the tests of adsorption and desorption. The results of them are shown in the following Table 1.

TABLE 1

| $BF_3$ Complex | Adsorbed Qty. of $BF_3$ (g/100 g-fiber) | Rate of Recovery (% by weight) |
|---|---|---|
| Phenol Complex | 7.9 | 89 |
| Alcohol Complex | 8.4 | 92 |

EXAMPLE 3

Experiment was carried out in the like manner as in Examples 1 and 2 except that 35 g of nonwoven fabric made of acrylic fiber (100% acrylonitrile) of 1 denier or less in gauge was packed into the tube in place of the acrylic fiber used in Example 1. The results of adsorption and desorption are shown in the following Table 2.

TABLE 2

| $BF_3$ Complex | Adsorbed Qty. of $BF_3$ (g/100 g-fiber) | Rate of Recovery (% by weight) |
|---|---|---|
| Ether Complex | 9.7 | 88 |
| Phenol Complex | 7.9 | 89 |
| Alcohol Complex | 8.4 | 92 |

EXAMPLE 4

Experiment was carried out in the like manner as in Example 1 except that a reaction mixture ($BF_3$: 0.25 wt. %) which was obtained by polymerizing the olefin content in an aromatic $C_9$ mixture in the presence of $BF_3$ phenol complex catalyst in place of the ethyl ether solution of $BF_3$ etherate, was used. As the result of $BF_3$ adsorption and desorption, the separation and removal of $BF_3$ was attained at an efficiency of 7.6 g/100 g-fiber.

Furthermore, by the treatment at a high temperature of 120° C., 89% of adsorbed $BF_3$ was recovered.

EXAMPLE 5

Experiment was carried out in the like manner as in Example 1 except that a reaction mixture ($BF_3$: 0.58 wt. %) which was obtained by polymerizing the olefin content in a $C_4$ mixture in the presence of $BF_3$ ether complex catalyst in place of the ethyl ether solution of $BF_3$ etherate, was used. As the result of $BF_3$ adsorption and desorption, the separation and removal of $BF_3$ was attained at an efficiency of 8.1 g/100 g-fiber.

Furthermore, through the treatment at a high temperature of 120° C., 93% of adsorbed $BF_3$ was recovered.

COMPARATIVE EXAMPLE 1

Polymerization initiators of 1 wt. % of t-butyl peroxide and 0.5 wt. % of thiourea (both relative to the quantity of acrylonitrile) were dissolved into a 5 wt. % toluene solution of acrylonitrile. The obtained solution was impregnated into activated carbon of 60 to 80 mesh which was previously dried at 150° C. Polymerization was carried out by heating at 100° C. for 2 hours in nitrogen current. After the heating, it was washed with toluene which was heated to its boiling point, in order to remove unreacted acrylonitrile and lower polymers.

The adsorption and separation of $BF_3$ was carried out in the like manner as in Example 1 except that activated carbon of the same volume was filled in the tube in place of the acrylic fiber.

It was confirmed that the efficiency of separation and removal of $BF_3$ was as low as 2.6 g/100 g-activated carbon.

EXAMPLE 6

The stainless steel made tube filled with the same acrylic fiber as that used in Example 1 was maintained at a constant temperature of 10° C.

Meanwhile, a $C_4$ fraction containing isobutylene was polymerized in liquid phase at 0° C. to 10° C. using $BF_3$ etherate to obtain a liquid reaction mixture ($BF_3$ content: 0.5 wt. %). This reaction mixture was fed to the above tube at a constant rate of 100 ml/hr. The concentration of $BF_3$ in the effluent was 0 (zero), from which it was confirmed that the $BF_3$ was completely adsorbed and removed.

With continuing the feeding, the concentration of $BF_3$ at the outlet port was monitored. When the leakage of $BF_3$ at the outlet port was detected after 18 hours, the feeding of reaction mixture was stopped.

After the feeding of reaction mixture was stopped, the fiber in the packed tube was washed with 1000 ml of toluene. The toluene was evaporated off by feeding nitrogen gas into the packed tube and the packed tube was weighed. The difference between the above measured weight and that of the initial weight before the feeding of $BF_3$ solution, was obtained. As a result, it was confirmed that the quantity of $BF_3$ adsorbed and retained in the acrylic fiber was 8.1 g per 100 g of the fiber.

The above packed tube filled with the acrylic fiber containing the adsorbed $BF_3$ was fed with nitrogen gas at a rate of 10 ml/min (as N.T.P.) and the heating of the packed tube was started so as to maintain the tube at 120° C. The nitrogen effluent was introduced into phenol.

By observing nitrogen flow at the outlet port, the feeding of nitrogen and the heating of the packed tube was continue until the white smoke of $BF_3$ became scarce. After that, the packed tube was weighed to obtain a result that the rate of recovery of adsorbed $BF_3$ was 93%.

EXAMPLE 7

The stainless steel made tube filled with the same acrylic fiber as that in Example 1 was maintained at a constant temperature of 10° C.

Meanwhile, a $C_9$ aromatic olefin fraction of the by-product of naphtha cracking was polymerized at 10° C. to 15° C. using $BF_3$ phenolate to obtain a liquid reaction mixture ($BF_3$ content: 0.2 wt. %) containing petroleum resin. The thus obtained reaction mixture was fed to the above tube at a constant rate of 100 ml/hr.

The concentration of $BF_3$ in the effluent was 0 (zero), from which it was confirmed that the $BF_3$ was completely adsorbed and removed.

With continuing the feeding, the concentration of $BF_3$ at the outlet port was monitored. When the leakage of $BF_3$ at the outlet port was detected after 18 hours, the feeding of reaction mixture was stopped.

After the feeding of reaction mixture was stopped, the fiber in the packed tube was washed with 1000 ml of toluene. The toluene was evaporated off by feeding nitrogen gas into the packed tube and the packed tube was weighed. The difference between the above measured weight and that of the initial weight before the feeding of $BF_3$ solution, was obtained. As a result, it was confirmed that the quantity of $BF_3$ adsorbed and retained in the acrylic fiber was 7.9 g per 100 g of the fiber.

The above packed tube filled with the acrylic fiber containing the adsorbed $BF_3$ was fed with nitrogen gas at a rate of 10 ml/min (as N.T.P.) and the heating of the packed tube was started so as to maintain the tube at 120° C. The nitrogen effluent was introduced into phenol. In this state, the feeding of nitrogen and the heating of the packed tube was continued until the white smoke of $BF_3$ became scarce at the outlet port. After that, the packed tube was weighed to obtain a result that the rate of recovery of adsorbed $BF_3$ was 89%.

As it will be understood from the foregoing examples, the $BF_3$ contained in an organic liquid can be separated effectively according to the method of the present invention. In addition, it is possible to recover the $BF_3$ for reuse.

What is claimed is:

1. A method for separating boron trifluoride comprising bringing an organic liquid mixture containing suspended or dissolved boron trifluoride into liquid phase contact with synthetic polymer fiber containing nitrile groups at a temperature of 50° C. or lower.

2. The method for separating boron trifluoride as claimed in claim 1, wherein said organic liquid mixture containing suspended or dissolved boron trifluoride is a liquid reaction mixture containing a polymer which is obtained by the liquid phase addition polymerization of olefins in the presence of a catalyst of boron trifluoride or its complex.

3. The method for separating boron trifluoride as claimed in claim 2, wherein said synthetic polymer fiber containing nitrile groups comprises an acrylonitrile polymer containing 80 mole % or more of an acrylonitrile repeating unit.

4. The method for separating boron trifluoride as claimed in claim 3, wherein said synthetic polymer fiber containing nitrile groups comprises an extremely fine fiber of 2 denier or less.

5. A method for separating or recovering boron trifluoride as claimed in claim 3, wherein the synthetic polymer fiber containing nitrile groups which was brought into contact with said liquid mixture containing $BF_3$, is heated to a temperature of 80° C. or higher.

6. The method for separating boron trifluoride as claimed in claim 2, wherein said synthetic polymer fiber containing nitrile groups comprises an extremely fine fiber of 2 denier or less.

7. A method for separating or recovering boron trifluoride as claimed in claim 2, wherein the synthetic polymer fiber containing nitrile groups which was brought into contact with said liquid mixture containing $BF_3$, is heated to a temperature of 80° C. or higher.

8. The method for separating boron trifluoride as claimed in claim 1, wherein said organic liquid mixture containing suspended or dissolved boron trifluoride is a liquid reaction mixture containing isobutylene polymer which is obtained by the liquid phase polymerization of isobutylene in the presence of a catalyst of boron trifluoride or its complex.

9. The method for separating boron trifluoride as claimed in claim 8 wherein said synthetic polymer fiber containing nitrile groups comprises an acrylonitrile polymer containing 80 mole % or more of an acrylonitrile repeating unit.

10. The method for separating boron trifluoride as claimed in claim 8 wherein said synthetic polymer fiber containing nitrile groups comprises an extremely fine fiber of 2 denier or less.

11. A method for separating or recovering boron trifluoride as claimed in claim 8, wherein the synthetic polymer fiber containing nitrile groups which was brought into contact with said liquid mixture containing $BF_3$, is heated to a temperature of 80° C. or higher.

12. The method for separating boron trifluoride as claimed in claim 1, wherein said organic liquid mixture containing suspended or dissolved boron trifluoride is a liquid reaction mixture containing hydrocarbon resins which is obtained by the polymerization of polymerizable components of $C_5$ olefins, $C_9$ aromatic olefins, $C_{10}$ olefins or their mixture in the presence of a catalyst of boron trifluoride or its complex.

13. The method for separating boron trifluoride as claimed in claim 12 wherein said synthetic polymer fiber containing nitrile groups comprises an acrylonitrile polymer containing 80 mole % or more of an acrylonitrile repeating unit.

14. The method for separating boron trifluoride as claimed in claim 12 wherein said synthetic polymer fiber containing nitrile groups comprises an extremely fine fiber of 2 denier or less.

15. A method for separating or recovering boron trifluoride as claimed in claim 12, wherein the synthetic polymer fiber containing nitrile groups which was brought into contact with said liquid mixture containing $BF_3$, is heated to a temperature of 80° C. or higher.

16. The method for separating boron trifluoride as claimed in claim 1, wherein said synthetic polymer fiber containing nitrile groups comprises an acrylonitrile polymer containing 80 mole % or more of an acrylonitrile repeating unit.

17. The method for separating boron trifluoride as claimed in claim 16, wherein said synthetic polymer fiber containing nitrile groups comprises an extremely fine fiber of 2 denier or less.

18. A method for separating or recovering boron trifluoride as claimed in claim 16, wherein the synthetic polymer fiber containing nitrile groups which was brought into contact with said liquid mixture containing $BF_3$, is heated to a temperature of 80° C. or higher.

19. The method for separating boron trifluoride as claimed in claim 1, wherein said synthetic polymer fiber containing nitrile groups comprises an extremely fine fiber of 2 denier or less.

20. A method for separating or recovering boron trifluoride as claimed in claim 19, wherein the synthetic polymer fiber containing nitrile groups which was brought into contact with said liquid mixture containing $BF_3$, is heated to a temperature of 80° C. or higher.

21. A method for separating or recovering boron trifluoride as claimed in claim 1, wherein the synthetic polymer fiber containing nitrile groups which was brought into contact with said liquid mixture containing $BF_3$, is heated to a temperature of 80° C. or higher.

22. The method for separating boron trifluoride as claimed in claim 1 wherein said synthetic polymer fiber containing nitrile groups does not contain substantially solvent-soluble low molecular weight components.

23. The method for separating boron trifluoride as claimed in claim 1 wherein said suspended or dissolved boron trifluoride is in the form of a $BF_3$ complex.

24. The method for separating boron trifluoride as claimed in claim 1 wherein said fiber is in the form of a woven fabric, non-woven fabric, braided fabric, or fluff.

25. A method for separating boron trifluoride from an organic liquid mixture comprising bringing an organic liquid mixture containing boron trifluoride or complex thereof into liquid phase contact with synthetic polymer fiber containing nitrile groups at a temperature of 50° C. or lower to adsorb boron trifluoride on said polymer fiber, then desorbing the adsorbed boron trifluoride from the fiber by heating the fiber and adsorbed boron trifluoride to a temperature of at least 80° C., said polymer fiber being substantially insoluble in said organic liquid.

* * * * *